United States Patent
Iwamoto et al.

(10) Patent No.: US 12,196,008 B2
(45) Date of Patent: Jan. 14, 2025

(54) DELIVERY RACK AND DELIVERY VEHICLE

(71) Applicant: TOYOTA JIDOSHA KABUSHIKI KAISHA, Toyota (JP)

(72) Inventors: Kunihiro Iwamoto, Nagakute (JP); Yuta Itozawa, Nagoya (JP); Hirotaka Komura, Tokyo (JP); Yutaro Takagi, Tokyo (JP); Yoshiaki Nakamoto, Nisshin (JP); Junya Ota, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 393 days.

(21) Appl. No.: 17/565,586

(22) Filed: Dec. 30, 2021

(65) Prior Publication Data
US 2022/0251882 A1    Aug. 11, 2022

(30) Foreign Application Priority Data

Feb. 8, 2021 (JP) ................................. 2021-018467

(51) Int. Cl.
*E05B 65/468* (2017.01)
*B62B 3/04* (2006.01)
(Continued)

(52) U.S. Cl.
CPC .............. *E05B 65/468* (2013.01); *B62B 3/04* (2013.01); *B62B 3/10* (2013.01); *B65G 1/10* (2013.01);
(Continued)

(58) Field of Classification Search
CPC ... E05B 65/465–468; B65G 1/10; B62B 3/04; B62B 3/10
See application file for complete search history.

(56) References Cited

U.S. PATENT DOCUMENTS 1,744,645 A * 1/1930 Kurten ................. E05B 65/468
312/221
2007/0069491 A1 3/2007 Ferraro et al.
(Continued)

FOREIGN PATENT DOCUMENTS

CN        210539939 U      5/2020
DE        4416768 A1 * 11/1994 ........... E05B 65/466
(Continued)

OTHER PUBLICATIONS

Feb. 21, 2024 Partial Translation of Office Action issued in Chinese Patent Application No. 202210060057.5.

*Primary Examiner* — Matthew W Ing
(74) *Attorney, Agent, or Firm* — Oliff PLC

(57) ABSTRACT

A rack includes: a casing; M pairs of supports that are provided inside the casing so as to extend in a depth direction and arrayed at regular intervals in a predetermined direction; and a lock mechanism that locks returnable containers housed while being supported so as to be slidable along the respective M pairs of supports. The lock mechanism has M rotary lock main bodies that are respectively provided at the M pairs of supports and each unlock at a predetermined rotation angle, and a coupling member that couples the M rotary lock main bodies to one another and allows them to rotate in conjunction with one another. The predetermined rotation angle for unlocking is different for each of the M rotary lock main bodies, and the M rotary lock main bodies are driven to rotate by a single driving source.

13 Claims, 11 Drawing Sheets

(51) Int. Cl.
*B62B 3/10* (2006.01)
*B65G 1/10* (2006.01)
*E05B 47/00* (2006.01)

(52) U.S. Cl.
CPC .. *E05B 47/0012* (2013.01); *E05B 2047/0017* (2013.01)

(56) References Cited

U.S. PATENT DOCUMENTS

2007/0164642 A1* 7/2007 Youngs ................. E05B 65/466
 312/221
2007/0244610 A1* 10/2007 Ozick ................. A47L 11/4072
 342/417
2009/0179534 A1* 7/2009 Chen ..................... E05B 65/466
 312/221

FOREIGN PATENT DOCUMENTS

| | | | |
|---|---|---|---|
| FR | 2283646 A1 | 4/1976 | |
| JP | 2006-037544 A | 2/2006 | |
| JP | 2017-145117 A | 8/2017 | |

* cited by examiner

FIG. 7

| PULLEY PHASE (ROTATION ANGLE) | LOCKED OR UNLOCKED STATE | | | | | | |
|---|---|---|---|---|---|---|---|
| | TOP LEFT ONE UNLOCKED, THE OTHERS LOCKED | MIDDLE LEFT ONE UNLOCKED, THE OTHERS LOCKED | BOTTOM LEFT ONE UNLOCKED, THE OTHERS LOCKED | TOP RIGHT ONE UNLOCKED, THE OTHERS LOCKED | MIDDLE RIGHT ONE UNLOCKED, THE OTHERS LOCKED | BOTTOM RIGHT ONE UNLOCKED, THE OTHERS LOCKED | ALL UNLOCKED | ALL LOCKED |
| | 45° | 90° | 135° | 315° | 270° | 225° | 0° | 180° |

DELIVERY RACK AND DELIVERY VEHICLE

CROSS-REFERENCE TO RELATED APPLICATION

This application claims priority to Japanese Patent Application No. 2021-018467 filed on Feb. 8, 2021, incorporated herein by reference in its entirety.

BACKGROUND

1. Technical Field

This disclosure relates to a delivery rack and a delivery vehicle.

2. Description of Related Art

Delivery of articles is desired to be automated and streamlined. The technique of delivering articles by housing them in returnable containers (also called returnable boxes) is widely known. Japanese Unexamined Patent Application Publication No. 2017-145117 (JP 2017-145117 A) discloses an article carrying apparatus in which a lock mechanism is disposed at a front-side end of an article housed in a housing part.

SUMMARY

The present inventors have been developing a delivery rack and a delivery vehicle in which returnable containers of one or more prespecified sizes can be housed while being supported so as to be slidable along respective pairs of supports that are provided inside a casing so as to extend in a depth direction and arrayed at regular intervals in an up-down direction or a left-right direction.

In the process, the present inventors have been working on a lock mechanism that can independently lock and unlock the returnable containers housed in the rack. For example, it is conceivable to provide an electric lock, such as a solenoid lock, for each pair of supports, which, however, raises a problem that the manufacturing costs of the delivery rack and the delivery vehicle increase due to a driving source (actuator or the like) provided for each electric lock.

For example, in the article carrying apparatus described in JP 2017-145117 A, the lock mechanism is provided for each article housed in the housing part. If a solenoid lock is provided for each of the housing parts corresponding to the respective articles in this article carrying apparatus, the manufacturing cost increases due to a driving source required for each solenoid lock.

Having been made in view of these circumstances, this disclosure provides a delivery rack and a delivery vehicle in which all returnable containers of one or more prespecified sizes can be housed in the rack, and which allow each returnable container to be independently locked and unlocked while keeping the manufacturing cost down as much as possible.

A delivery rack according to one aspect of this disclosure includes: a casing; M pairs of supports, with M being an integer not less than two, that are provided inside the casing so as to extend in a depth direction and arrayed in M tiers at regular intervals in a predetermined direction that is one of an up-down direction and a left-right direction; and a lock mechanism that locks returnable containers housed while being supported so as to be slidable along the respective M pairs of supports. The delivery rack is able to house all the returnable containers of one or more prespecified sizes. The lock mechanism includes M rotary lock main bodies that are respectively provided at the M pairs of supports and each unlock at a predetermined rotation angle, and a coupling member that couples the M rotary lock main bodies to one another and allows the M rotary lock main bodies to rotate in conjunction with one another. The predetermined rotation angle for unlocking is different for each of the M rotary lock main bodies, and the M rotary lock main bodies are driven to rotate by a single driving source.

A delivery vehicle according to one aspect of this disclosure is a delivery vehicle including a rack. The rack has a casing; M pairs of supports, with M being an integer not less than two, that are provided inside the casing so as to extend in a depth direction and arrayed in M tiers at regular intervals in a predetermined direction that is one of an up-down direction and a left-right direction; and a lock mechanism that locks returnable containers housed while being supported so as to be slidable along the respective M pairs of supports. The rack is able to house all the returnable containers of one or more prespecified sizes. The lock mechanism includes M rotary lock main bodies that are respectively provided at the M pairs of supports and each unlock at a predetermined rotation angle, and a coupling member that couples the M rotary lock main bodies to one another and allows the M rotary lock main bodies to rotate in conjunction with one another. The predetermined rotation angle for unlocking is different for each of the M rotary lock main bodies, and the M rotary lock main bodies are driven to rotate by a single driving source.

As described above, in one aspect of this disclosure, the rack capable of housing all the returnable containers of one or more prespecified sizes has the lock mechanism including the M rotary lock main bodies that are respectively provided at the M pairs of supports and each unlock at a predetermined rotation angle, and the coupling member that couples the M rotary lock main bodies to one another and allows the M rotary lock main bodies to rotate in conjunction with one another. The predetermined rotation angle for unlocking is different for each of the M rotary lock main bodies, and the M rotary lock main bodies are driven to rotate by the single driving source. Since the predetermined rotation angle for unlocking is different for each of the M rotary lock main bodies, the lock on only one returnable container can be released (only one returnable container can be unlocked) even when the M rotary lock main bodies are driven to rotate in conjunction with one another by the single driving source. Thus, in the lock mechanism in one aspect of the present disclosure, the M rotary lock main bodies are driven to rotate in conjunction with one another by the single driving source, which makes it possible to independently lock and unlock each returnable container while keeping the manufacturing cost of the rack down as much as possible.

A protrusion that protrudes from the returnable container toward an outer side in an orthogonal direction orthogonal to the predetermined direction may slide over the supports, and the protrusion may have a notch that is engaged with the rotary lock main body when locking the returnable container and disengaged from the rotary lock main body when unlocking the returnable container. In this configuration, the returnable containers can be locked using the protrusions thereof.

Each of the M rotary lock main bodies may unlock at another predetermined rotation angle that is common to all the M rotary lock main bodies. This configuration makes it possible to release the lock on all the returnable containers at the same time by simply changing the rotary lock main bodies, without separately providing a dedicated mechanism.

The M pairs of supports, with M being an integer not less than four, may be divided and arrayed in m rows, with m being an integer not less than two and a divisor of M, in a direction orthogonal to the predetermined direction of the casing, and be arrayed in M/m tiers at regular intervals in each row, so as to be arrayed in a total of M tiers. This configuration makes it possible to independently lock and unlock each returnable container by a single driving source also when dividing and housing the returnable containers in m rows.

Alternatively, the rack may be able to house returnable containers in L rows, with L being an integer not less than one, in a direction orthogonal to the predetermined direction of the casing, and the rack may include, in each row, the M pairs of supports and the lock mechanism of which the M rotary lock main bodies are driven by the single driving source. This configuration makes it possible to independently lock and unlock each returnable container by a single driving source in each row when dividing and housing the returnable containers in L rows.

The coupling member may include a belt. This configuration can reduce restrictions on the arrangement of the coupling member in the casing.

The coupling member may include a gear. This configuration allows for accurate control of the predetermined rotation angle.

The delivery vehicle may be an autonomous vehicle. This configuration can reduce delivery costs.

This disclosure can provide a delivery rack and a delivery vehicle in which all returnable containers of one or more prespecified sizes can be housed in the rack, and which allow each returnable container to be independently locked and unlocked while keeping the manufacturing cost down as much as possible.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a table showing locked and unlocked states relative to rotation angles of pulleys in the lock mechanism of FIG. 4;

DETAILED DESCRIPTION OF EMBODIMENTS

Figure 1:
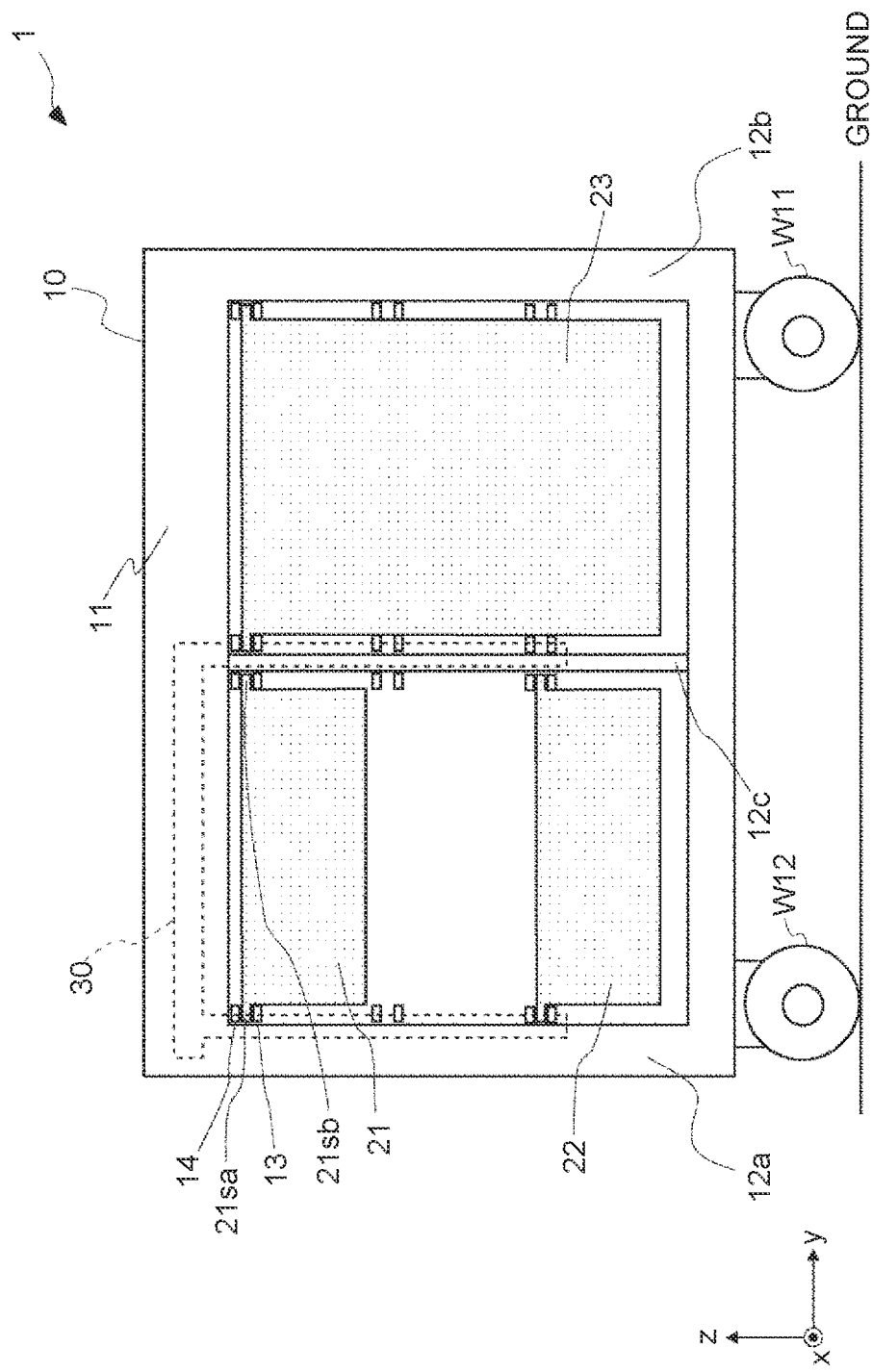
FIG. 1 is a schematic side view showing one example of a delivery vehicle according to a first embodiment.

Specific embodiments will be described in detail below with reference to the drawings. The same or corresponding elements in the drawings are denoted by the same reference signs, and overlapping description will be omitted as necessary to clarify the description.

First Embodiment

FIG. 1 is a schematic side view showing one example of a delivery vehicle according to a first embodiment. The right-handed xyz orthogonal coordinate system shown in FIG. 1 and other drawings is, of course, for the convenience of describing positional relationships among components. Normally, a z-axis positive direction is a vertically upward direction and an xy-plane is a horizontal plane, which applies to all the drawings.

As shown in FIG. 1, a delivery vehicle 1 according to this embodiment is a vehicle that includes a rack 10 and two pairs of wheels W11, W12 and carries articles. The two pairs of wheels W11, W12 are rotatably fixed on a lower side of a casing 11 of the rack 10 and driven by a driving source (not shown), such as a motor. Of course, the number of wheels is not limited to a particular number, and another configuration can also be adopted, such as a configuration in which no wheels are provided and the delivery vehicle 1 is floated and moved using high-pressure air.

Here, the delivery vehicle 1 can include a control unit (not shown) that performs various modes of control relating to the rack 10 etc. These various modes of control can include control of the driving of the wheels W11, W12 in the delivery vehicle 1, and control of the engagement and release of lock (locking and unlocking) by a lock mechanism 30 to be described later. The control unit can include arithmetic units that are each a central processing unit (CPU), for example, and a storage unit, such as a random-access memory (RAM) or a read-only memory (ROM), that stores various control programs, data, etc. Thus, the control unit can function as a computer. The control unit can include an integrated circuit in its configuration.

The rack 10 included in the delivery vehicle 1 according to the embodiment is a rack that can house all the returnable containers 21, 22, 23, etc. of two or more prespecified sizes. In FIG. 1 that is a side view, the returnable containers 21 to 23 are indicated by hatching to help understanding. The same applies to FIG. 4, FIG. 8, FIG. 9, and FIG. 11 to be described later.

An article to be delivered is delivered by being housed in a returnable container sized to be able to house that article. The returnable containers to be housed, including the returnable containers 21, 22, 23, are not limited to any type of containers; for example, the returnable containers are made of plastic, cardboard, wood, or metal and repeatedly used. While a returnable container itself can constitute an article, normally, an article is delivered in a state of being housed in a returnable container.

As shown in FIG. 1, the rack 10 includes the casing 11 and M pairs of rails 13 that are provided inside the casing 11 so as to extend in a depth direction (x-axis direction) and arrayed at regular intervals in a height direction (z-axis direction). In the delivery vehicle 1, the casing 11 constitutes a part of a vehicle body. The rails 13 are one example of supports, and here an example where the rails 13 are provided in two rows, with three pairs in each row (an example where a total of six pairs of rails 13 are provided) is described. M is an integer not less than two, and at a minimum, M pairs of supports should be provided inside the casing 11 so as to extend in the depth direction and arrayed in M tiers at regular intervals (hereinafter referred to as "intervals B") in the height direction (up-down direction).

While the example of two rows is described, the number m of rows may be any number that is an integer not less than two and a divisor of M, and in this case, M is an integer not less than four. Thus, the M pairs of rails 13 can be divided and arrayed in m rows in an orthogonal direction (width direction) orthogonal to the up-down direction of the casing 11, and in this case, the rails 13 may be arrayed in M/m tiers at regular intervals B in each row so as to be arrayed in a total of M tiers. Of course, the M pairs of rails 13 can also be arrayed in M tiers in one row, i.e., in M tiers at regular intervals B in the up-down direction.

In this embodiment, the returnable containers 21 to 23 of two or more prespecified sizes are equal in the width in the y-axis direction and the depth in the x-axis direction. However, the returnable containers 21, 22 and the returnable container 23 are different from each other in the height in the z-axis direction. The height of the returnable containers 21, 22 having the smallest size is designed according to the interval between the rails 13 that are adjacent to each other in the z-axis direction, i.e., the interval B. Of course, the height of the returnable containers 21, 22 is smaller than the interval B between these rails 13. The height of the returnable container 23 is designed to be about three times as large as the height of the returnable container 21. Thus, the heights of the returnable containers of two or more prespecified sizes are designed to be about integral multiples of the interval between the rails 13 that are adjacent to each other in the z-axis direction.

While the returnable containers have two sizes in this example of the configuration shown in FIG. 1, the number of sizes may be three or larger. In the example of FIG. 1, other than the returnable containers 21 to 23, for example, a returnable container with a height about twice that of the returnable container 21 may be separately provided.

The rack 10 further has auxiliary parts 14 that are provided so as to face the rails 13. Here, the rails 13 and the auxiliary parts 14 are each provided so as to rise from an inner surface of the casing 11 or a partition plate 12c in a substantially perpendicular direction.

To dispose a total of six pairs of rails 13 in two rows, the rack 10 includes the partition plate 12c that separates rows. As shown in FIG. 1, the partition plate 12c is provided parallel to a front plate 12b and a back plate 12a constituting parts of the casing 11 (i.e., parallel to an xz-plane) so as to extend from one side to the other side of the casing 11. Here, a partition plate like the partition plate 12c is provided such that the interval between the front plate 12b of the casing 11 and the adjacent partition plate 12c, and the interval between the back plate 12a of the casing 11 and the adjacent partition plate 12c (and the interval between partition plates, when m is an integer not less than three) are equal.

Thus, in the rack 10, the M pairs of rails 13 are provided so as to extend in the depth direction (x-axis direction) in m rows defined by inner surfaces (the front plate 12b and the back plate 12a) of the casing 11 and the partition plate 12c, and are arrayed at regular intervals B in the height direction (z-axis direction). Therefore, in this example of the configuration shown in FIG. 1, all returnable containers of any size can be housed along the rails 13 if the width thereof is nearly equal to the width of an inside of the casing 11 and the height thereof is nearly an integral multiple of (in this example, one to three times) the interval B in the height direction. As a result, this example of the configuration can streamline the delivery using the returnable containers 21 to 23 of two or more prespecified sizes.

Next, housing of the returnable containers using the rails 13 in this example of the configuration will be specifically described. First, the casing 11 has a configuration in which a top plate provided on a positive side in the z-axis direction, a bottom plate provided on a negative side in the z-axis direction, a front plate 12b provided on a positive side in the y-axis direction, and a back plate 12a provided on a negative side in the y-axis direction are integrally formed. Thus, both lateral sides of the casing 11 are open to allow the returnable containers 21 to 23 to be put in and out. Alternatively, doors that can be opened and closed may be provided on both lateral sides of the casing 11 that are open. One of the lateral sides of the casing 11 may be closed.

Each pair of rails 13 is provided so as to rise respectively from the front plate 12b of the casing 11 and the partition plate 12c or respectively from the back plate 12a of the casing 11 and the partition plate 12c in a substantially perpendicular direction. Since the rails 13 should be able to at least support the returnable containers 21 to 23, the rails 13 may be provided so as to extend discontinuously in the depth direction (x-axis direction). Alternatively, instead of the rails 13, short supports may be disposed so as to line up in the depth direction (x-axis direction). Further, a configuration in which the supports are formed by magnets and partially or entirely attract the returnable containers 21 to 23 may be adopted.

The returnable container 21 can be put in and out as protrusions 21sa, 21sb protruding from the returnable container 21 toward outer sides in a width direction slide over the pair of rails 13 that are adjacent to the returnable container 21 and face each other. Here, the protrusions 21sa, 21sb of the returnable container 21 are housed in a state of being placed on the rails 13. To thus house each of the protrusions 21sa, 21sb, the auxiliary part 14 that presses the protrusion 21sa or 21sb so as to be held between the rail 13 and the auxiliary part 14 is provided. The auxiliary part 14 is provided so as to face the rail 13 in the z-axis direction. Each pair of rails 13 and each pair of auxiliary parts 14 corresponding to the respective protrusions 21sa, 21sb are provided so as to rise respectively from the back plate 12a and the partition plate 12c in a substantially perpendicular direction. The returnable containers 22, 23 are put in and out in the same manner by sliding over the rails 13.

Next, the lock mechanism 30 that is one of the main features of this embodiment will be described. In this embodiment, the rack 10 includes the lock mechanism 30 that locks the returnable containers 21 to 23 each housed while being supported so as to be slidable along one of the M pairs of rails 13.

Figure 2:
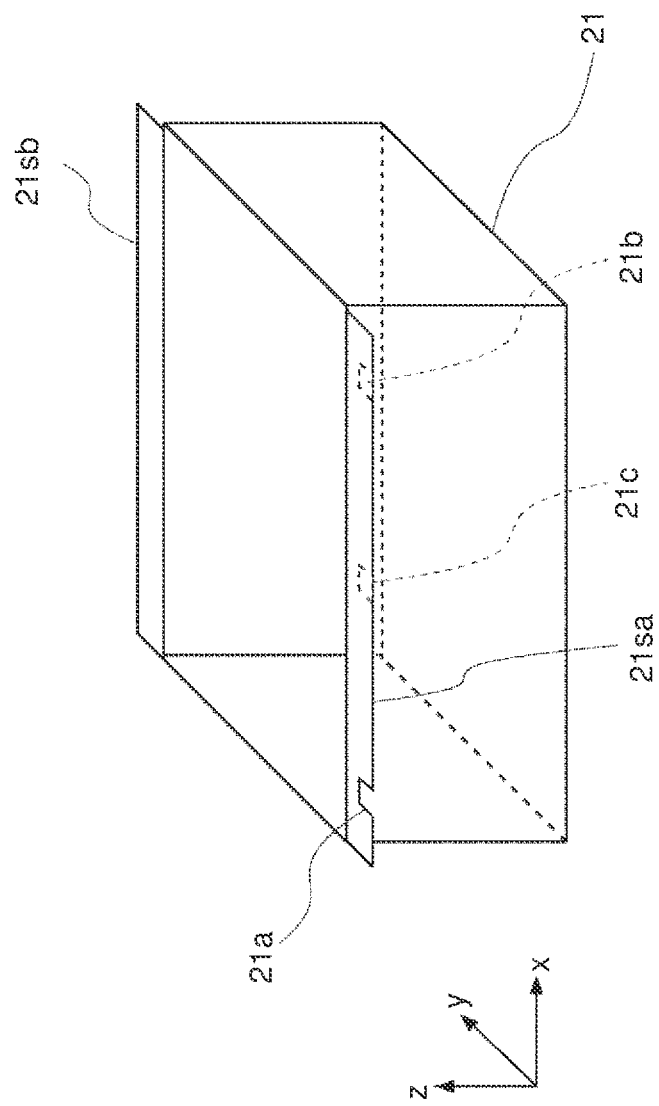
FIG. 2 is a schematic perspective view showing one example of a returnable container housed in the delivery vehicle according to the first embodiment.

Before details of the lock mechanism 30 are described, first, details of an example of the configuration of the returnable container 21 adapted to the lock mechanism 30 will be described with reference to FIG. 2. In terms of delivery operation, it is desirable that the other returnable containers including the returnable containers 22, 23 have basically the same shape except for their sizes. FIG. 2 is a schematic perspective view showing one example of a returnable container housed in the rack 10 of the delivery vehicle 1 according to the first embodiment.

As its shape is illustrated in FIG. 2, the returnable container 21 can have the protrusions (flanges) 21sa, 21sb that allow the returnable container 21 to slide over the rails 13. Thus, the returnable container 21 can be configured such that the protrusions 21sa, 21sb protruding from the returnable container 21 toward the outer sides in the width direction slide over the rails 13. Here, the width direction refers to a direction that is orthogonal to the up-down direction and, of course, orthogonal also to the depth direction since the protrusions slide over the rails 13.

Further, as shown in FIG. 2, the protrusion 21sa is provided with a notch 21a. As will be described later, the lock mechanism 30 locks the returnable container 21 using the protrusion 21sa thereof. While this is not shown, the returnable container 21 can have a lid that can cover up to the protrusions 21sa, 21sb. When providing such a lid, the lid should have a notch at a position corresponding to the notch 21a of the protrusion 21sa, and the lock mechanism 30 should be configured according to the thickness of that notch and the notch 21a.

Of course, since the returnable containers 22, 23 are housed on the rails 13 without being distinguished from the returnable container 21, these returnable containers are likewise provided with a protrusion in which the notch 21a is provided at the same position. However, depending on the configuration of the lock mechanism 30, a notch may be provided in the protrusion on the opposite side (in the case of the returnable container 21, the protrusion 21sb). For convenience, FIG. 2 shows regions 21b, 21c as other examples of the region to provide the notch 21a. Thus, the position of the notch 21a may be another position such as the region 21b or 21c as long as that position corresponds to the arrangement of the lock mechanism 30. In any case, the returnable container 21 can be locked in a state of having been slid to a fixed position and is unlikely to be locked in a state of having been slid halfway.

The returnable containers 21 to 23 may be provided with a handle for carrying around. This handle for carrying around is different from a drawer handle for using the returnable containers 21 to 23 as drawers. Regarding the returnable container 21, this handle can be described as a through-hole that is provided, for example, near the center of each of the protrusions 21sa, 21sb (in the case of the protrusion 21sa, near the region 21c) and large enough to put a hand therein to grasp the returnable container 21.

Figure 3:
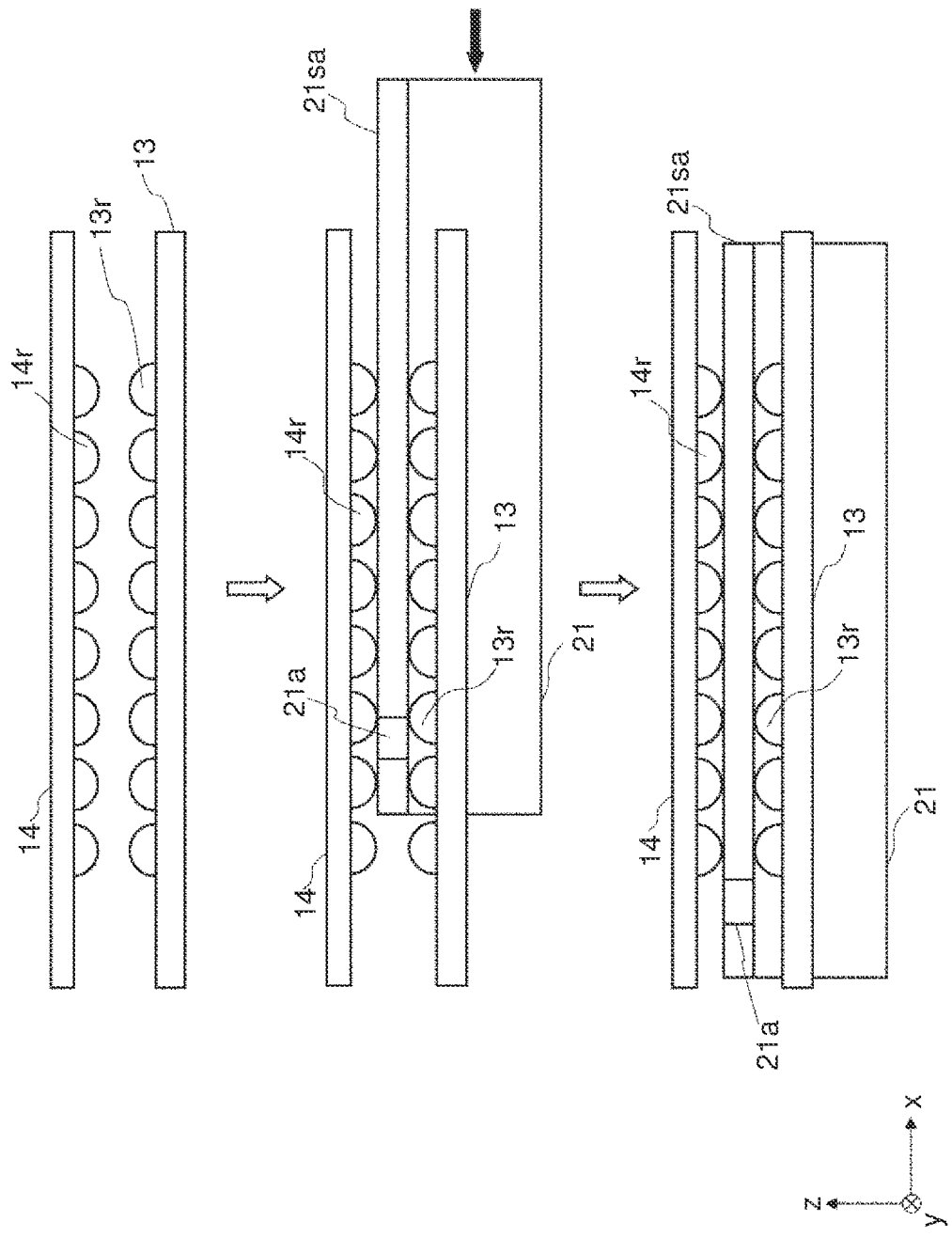
FIG. 3 is a schematic side view showing one example of how the returnable container is housed onto rails in the delivery vehicle according to the first embodiment.

Next, an example of the structures of the rail 13 and the auxiliary part 14 and how to house the returnable container 21 will be described with reference to FIG. 3. FIG. 3 is a schematic side view showing one example of how the returnable container 21 is housed onto the rails 13 in the delivery vehicle 1. In FIG. 3, only the rail 13 and the auxiliary part 14 in the top tier are shown while other parts are omitted.

As shown in FIG. 3, the rail 13 is a roller rail and includes a plurality of rollers 13r. The rollers 13r are made of plastic, for example. The rollers 13r can reduce the coefficient of friction between a lower surface of the protrusion 21sa of the returnable container 21 and the rail 13, as well as can mitigate generation of abrasion dust resulting from sliding of the protrusion 21sa.

As shown at the center of FIG. 3, the auxiliary part 14 is a part that presses the protrusion 21sa so as to be held between the rail 13 and the auxiliary part 14. The auxiliary part 14 can be a roller rail like the rail 13 and include a plurality of rollers 14r that are made of plastic, for example. The rollers 14r can reduce the coefficient of friction between an upper surface of the protrusion 21sa of the returnable container 21 and the auxiliary part 14, as well as can mitigate generation of abrasion dust resulting from sliding of the protrusion 21sa. When the returnable container 21 is housed, the protrusion 21sb, like the protrusion 21sa, is also held between the rail 13 and the auxiliary part 14.

Next, the procedure of inserting the returnable container 21 into the casing 11 will be described. First, the returnable container 21 that is not yet inserted as shown at the top of FIG. 3 is inserted while being slid over the rails 13 as shown at the center of FIG. 3. The returnable container 21 is slid over the rails 13 with the lock thereon released. Therefore, before the start of insertion and during insertion, the lock mechanism 30 is in a state of having released the lock.

In a state where the returnable container 21 is stopped at a predetermined position (housed position) on the rails 13 as shown at the bottom of FIG. 3, activating the lock mechanism 30 can lock the returnable container 21. If a lid (not shown) is provided on the returnable container 21, the lid of the returnable container 21 is locked at the same time. Of course, when the lock mechanism 30 for the returnable container 21 is released, the returnable container 21 becomes movable again as shown at the center in FIG. 3. The same applies to the other returnable containers 22, 23.

Figure 4:
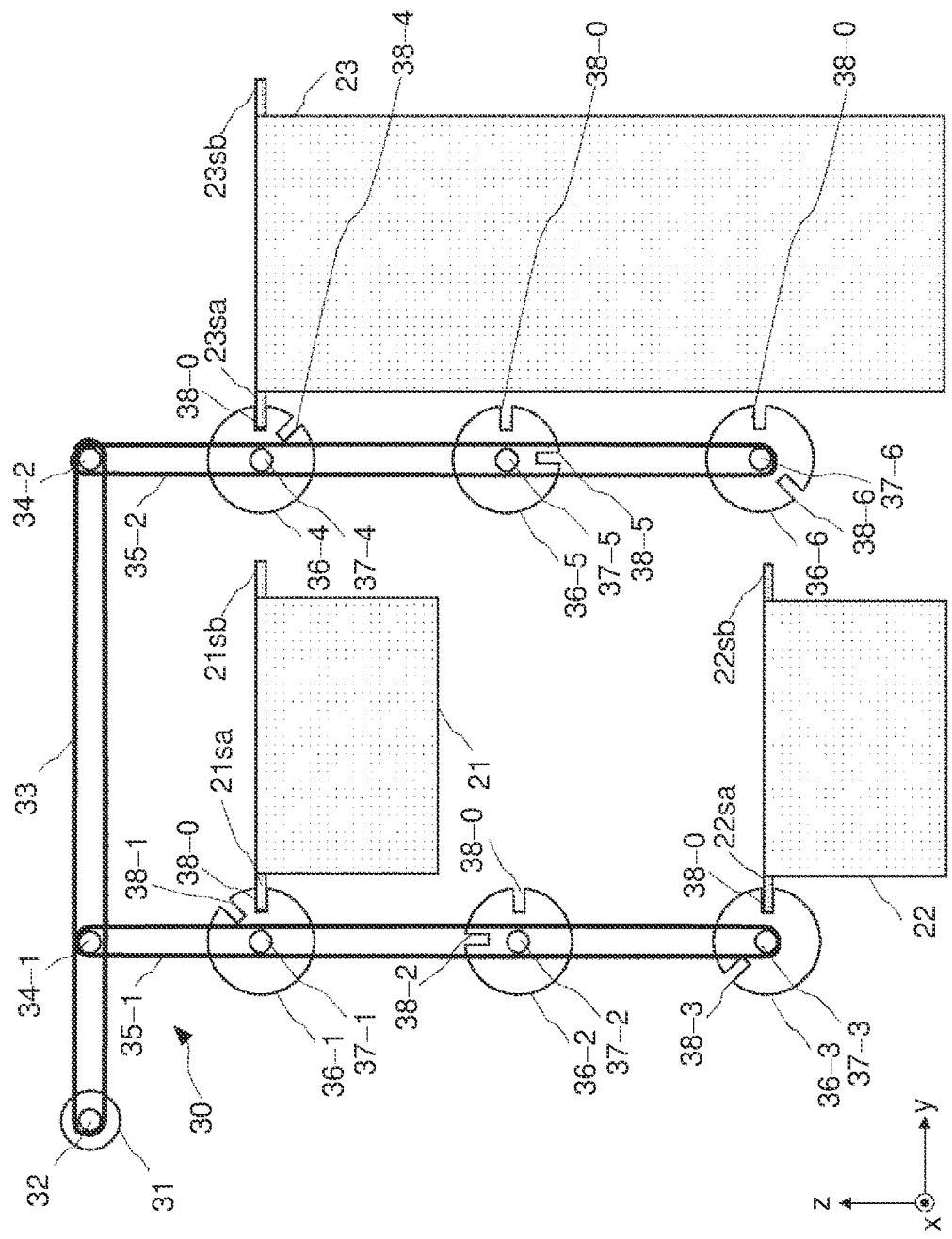
FIG. 4 is a schematic side view showing one example of a lock mechanism in the delivery vehicle according to the first embodiment.
Figure 5:
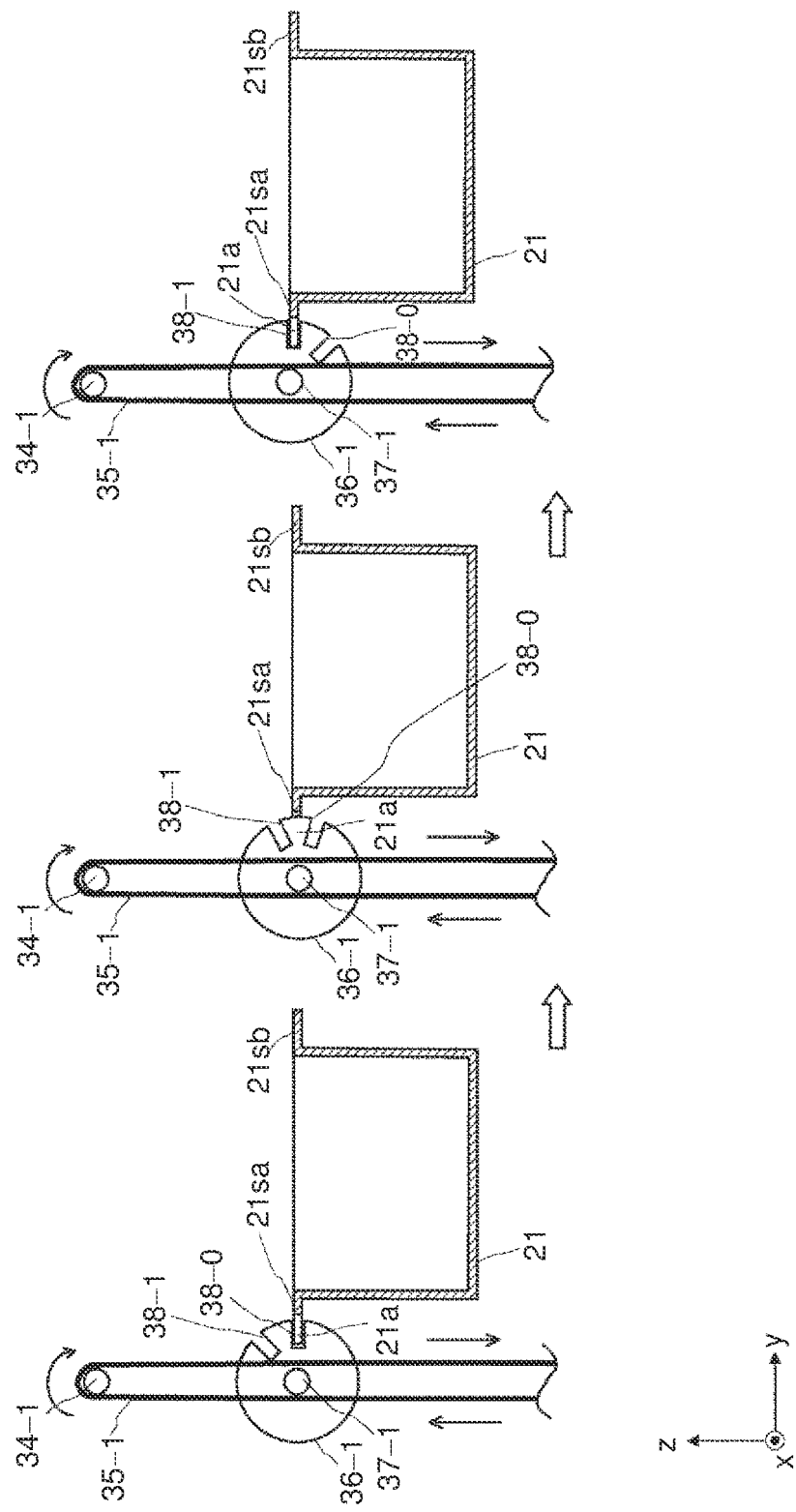
FIG. 5 is a schematic side view showing how one returnable container is locked in the lock mechanism of FIG. 4.
Figure 6:
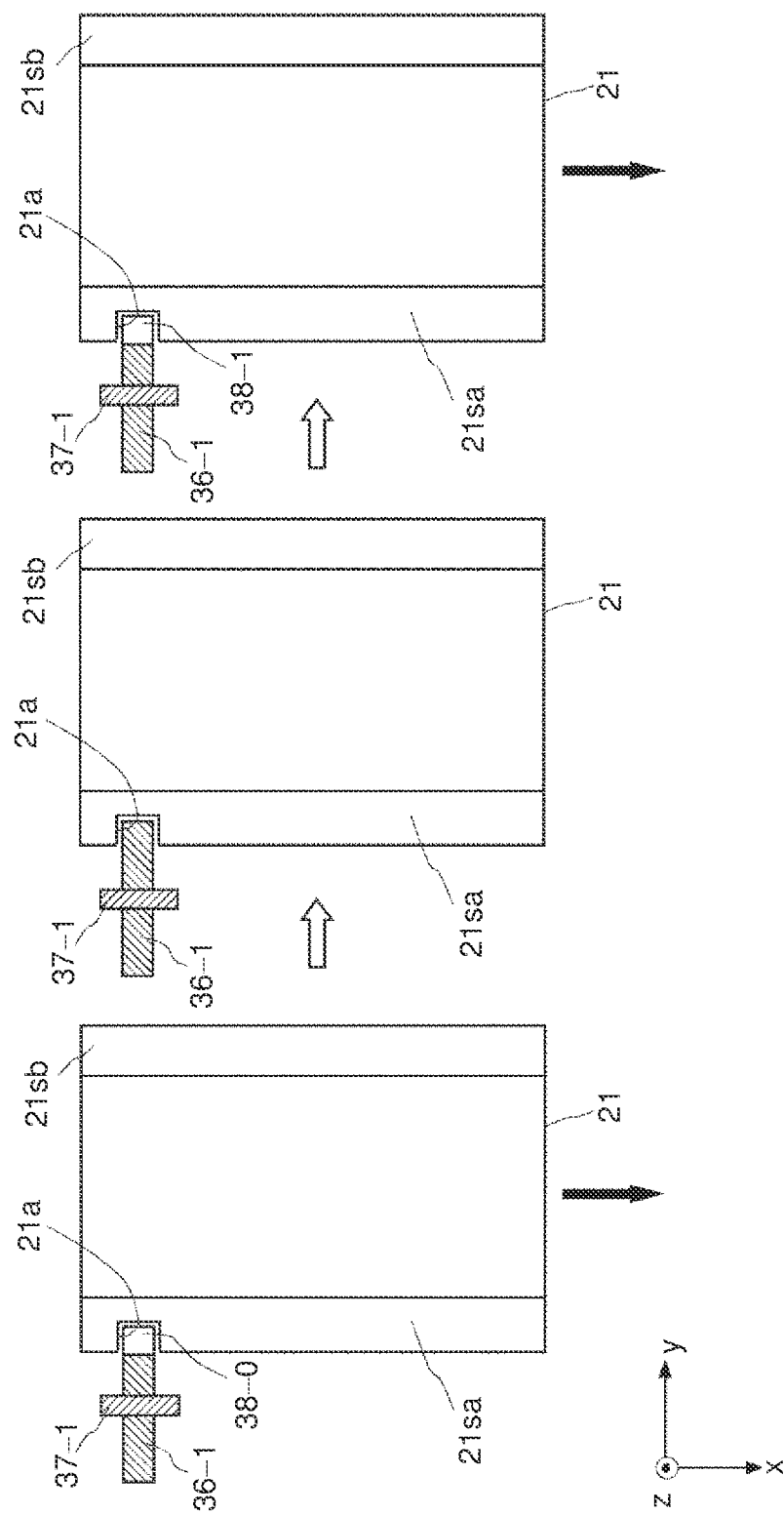
FIG. 6 is a schematic sectional view showing how one returnable container is locked in the lock mechanism of FIG. 4.

Next, details of the lock mechanism 30 will be described with reference to FIG. 4 to FIG. 7. FIG. 4 is a schematic side view showing one example of the lock mechanism 30 in the delivery vehicle 1. FIG. 5 is a schematic side view showing how one returnable container 21 to be housed in the top left tier is locked in the lock mechanism 30 of FIG. 4, and FIG. 6 is a schematic sectional view showing how it is locked. FIG. 7 is a table showing locked and unlocked states relative to rotation angles of pulleys in the lock mechanism 30 of FIG. 4.

As shown in FIG. 4, the lock mechanism 30 includes M rotary lock main bodies 36-1 to 36-6 that are respectively provided at the M (in this example of the configuration, M=6) pairs of rails 13 and each unlock at a predetermined rotation angle. Further, the lock mechanism 30 includes coupling members 33, 35-1, 35-2 that couple the M rotary lock main bodies 36-1 to 36-6 to one another and allow the M rotary lock main bodies 36-1 to 36-6 to rotate in conjunction with one another. The rotary lock main bodies and the coupling members are not limited to those illustrated here, and other structures having the same functions can also be adopted.

In the lock mechanism 30, the predetermined rotation angle for unlocking is different for each of the M rotary lock main bodies 36-1 to 36-6 (each rotary lock main body unlocks at a different predetermined rotation angle), and the M rotary lock main bodies 36-1 to 36-6 are driven to rotate by a single driving source. While a motor 31 having a rotating shaft 32 will be described here as an example of the single driving source, the single driving source is not limited thereto and may be another actuator or the like. The rotary lock main bodies 36-1 to 36-6 can be pulleys on which plates with notches (a notch 38-1 etc.) are mounted. While such pulleys will be described below as an example, the rotary lock main bodies 36-1 to 36-6 are not limited thereto. The plates may have a disc shape as shown in FIG. 4, but may instead have a polygonal shape.

First, a mechanism for transmitting power from the motor 31 to the pulleys 36-1 to 36-6 (transmission mechanism) will be described. This transmission mechanism is a part of the lock mechanism 30 and includes the coupling members. This transmission mechanism can have the rotating shaft 32 of the motor 31, a driven rotating shaft 34-1, a driven rotating shaft 34-2 located at a position farthest away from the rotating shaft 32, the belt 33, the belt 35-1, and the belt 35-2. Such a transmission mechanism is a mechanism that connects the M rotary lock main bodies 36-1 to 36-6 to one another and drives them in synchronization by the motor 31.

Details of the illustrated transmission mechanism will be described. The belt 33 is stretched across the rotating shaft 32 and the driven rotating shaft 34-2 and transmits the power of the motor 31 to the driven rotating shaft 34-2. The driven rotating shaft 34-1 is disposed such that the power can be transmitted by the belt 33 between the rotating shaft 32 and the driven rotating shaft 34-1. The belts 35-1, 35-2 are wrapped on the driven rotating shafts 34-1 and 34-2, respectively, at a position in an axial direction offset from the position in the axial direction at which the belt 33 is wrapped, and the power is transmitted to each of the belts 35-1, 35-2. In this way, the six rotary lock main bodies 36-1 to 36-6 can be driven in synchronization.

The pulley 36-1 is provided on a left end side of a housing place in the top left tier, and has the notch 38-1 and a common notch 38-0 on its outer circumference. A rotating shaft (pulley rotating shaft) 37-1 of the pulley 36-1 is driven through the belt 35-1, and this driving changes the positions (phases) of the notches 38-1, 38-0. The pulley 36-1 is engaged with the notch 21a of the protrusion 21sa when locking the returnable container 21 and disengaged from the notch 21a when unlocking the returnable container 21. As illustrated on the left side of FIG. 5 and FIG. 6, driving of the motor 31 can be controlled so as to create a state where the position of the notch 21a in the protrusion 21sa of the returnable container 21 and the position of the common notch 38-0 coincide with each other. In this state, the returnable container 21 can be pulled out in the direction indicated by the arrow on the left side of FIG. 6 (x-axis positive direction).

When the belt 35-1 is further moved in the direction of the arrows of FIG. 5 by driving control of the motor 31, this results in a state where the position of the notch 21a coincides with neither of the common notch 38-0 and the notch 38-1 in the pulley 36-1 as illustrated at the center of FIG. 5 and FIG. 6. In this state, the negative side of the notch 21a in the x-axis direction and the pulley 36-1 engage with each other, preventing the returnable container 21 from being pulled out in the x-axis positive direction. Further, driving of the motor 31 can be controlled so as to create a state where the position of the notch 21a and the position of the notch 38-1 coincide with each other as illustrated on the right side of FIG. 5 and FIG. 6. In this state, the returnable container 21 can be pulled out in the direction indicated by the arrow on the right side of FIG. 6 (x-axis positive direction).

Thus, the protrusion 21sa protruding from the returnable container 21 toward the outer side in the width direction may slide over the rail 13, and the protrusion 21sa may have the notch 21a that is engaged with the pulley 36-1 when locking the returnable container 21 and disengaged from the pulley 36-1 when unlocking the returnable container 21. In this configuration, the returnable container 21 can be locked using the protrusion 21sa thereof.

While the pulley 36-1 has been described, the other pulleys 36-2 to 36-6 have basically the same configuration, except that their installation positions are different and that the directions of notches corresponding to the phases of notches 38-2 to 38-6 (the predetermined rotation angles) are different from the direction of the notch 38-1. The pulleys 36-2, 36-3 are provided on a left end side of housing places in the middle left tier and the bottom left tier, respectively, and pulley rotating shafts 37-2, 37-3 thereof are driven through the belt 35-1. The pulleys 36-4, 36-5, 36-6 are provided on a left end side of housing places in the top right tier, the middle right tier, and the bottom right tier, respectively, and pulley rotating shafts 37-4, 37-5, 37-6 thereof are driven through the belt 35-2.

The phases of the notches 38-1 to 38-6 are different from one another, and therefore the notch 21a is disengaged at a different phase depending on the housing place of the returnable container 21. In other words, the notches of the returnable containers 21 to 23 of FIG. 4 are disengaged from the notches 38-1, 38-3, 38-4, respectively, at different phases and can be separately disengaged. In the example of FIG. 4 to FIG. 6, advancing the phases (rotation angles) of the pulleys 36-1 to 36-6 by 45°, with the state of FIG. 4 being 0°, as shown in FIG. 7 by driving control of the motor 31 can unlock the housing place in the top left tier while locking the other housing places. Similarly, advancing the phases by 90°, 135°, 315°, 270°, and 225° can unlock the housing places in the middle left tier, the bottom left tier, the top right tier, the middle right tier, and the bottom right tier, respectively, while locking the other housing places.

On the other hand, the phase of the common notch 38-0 is the same in all the pulleys 36-1 to 36-6. At that phase, the notch 21a is disengaged at the same phase in whichever housing place the returnable container 21 may be housed, and the notches can be disengaged at all the housing places at the same time. In other words, the notches of the returnable containers 21 to 23 of FIG. 4 are disengaged from the notches 38-0 of the pulleys 36-1, 36-3, 36-4, respectively, at the same phase and can be disengaged at once. In the example of FIG. 4 to FIG. 6, setting the phases (rotation angles) of the pulleys 36-1 to 36-6 to 0°, with the state of FIG. 4 being 0°, as shown in FIG. 7 by driving control of the motor 31 can disengage the notches to unlock the housing places in all the rows and tiers.

Thus, each of the six pulleys 36-1 to 36-6 is configured to unlock at the other predetermined rotation angle that is common to all the pulleys. This configuration makes it possible to release the lock on all the returnable containers at the same time by simply changing the rotary lock main bodies 36-1 to 36-6, without separately providing a dedicated mechanism.

Further, in the example of FIG. 4 to FIG. 6, setting the phases (rotation angles) of the pulleys 36-1 to 36-6 to 180°, with the state of FIG. 4 being 0°, as shown in FIG. 7 by driving control of the motor 31 can engage the notches to lock the housing places in all the rows and tiers. If the lock mechanism 30 has good accuracy, it is possible to lock the housing places, i.e., prohibit the returnable containers from being pulled out, in all the rows and tiers except at the rotation angles shown in FIG. 7 (other than 180°).

As has been described above, in the lock mechanism 30, each pulley has the notch provided in a different direction (corresponding to the rotation angle), and the rotation angles of the pulleys are controlled while the pulleys are synchronized with one another to thereby allow for selection between the locked state and the unlocked state of the returnable containers. The lock mechanism 30 is not limited to the example of FIG. 3 to FIG. 7. It is possible to release the lock on only a returnable container at an arbitrary position by controlling the input phase of the motor 31 while the pulleys are connected to one another with the phases of the notches (the notches other than the notches 38-0) in all the pulleys shifted from one another so as not to overlap. When the common notches 38-0 with the matching phase are additionally provided in the respective pulleys, the lock on all the returnable containers can be released at the same time at that phase (in this example, 0°). Moreover, when a phase at which none of the notches 38-1 to 38-6 and the common notches 38-0 of the pulleys overlaps with another notch is provided, all the returnable containers can be locked at the same time at that phase.

As an example different from FIG. 3 to FIG. 7, for example, a notch is provided in each pulley at the position of 0° and another notch is provided in each pulley so as to be shifted in increments of 10°. Thus, in addition to an all-open mode for unlocking all the housing places and an all-lock mode for locking all the housing places, the lock on arbitrary one of 34 returnable containers can be released. Further, if the lock mechanism 30 has good accuracy in synchronously driving the pulleys, it is possible to release the lock on arbitrary one of an even larger number of returnable containers using the single motor 31 by reducing the amount by which the notches of the pulleys are shifted from one another. To put it the other way around, the number of returnable containers that can be controlled by the single motor 31 is determined by the accuracy in this respect.

While the example where the common notches 38-0 are provided in the respective pulleys 36-1 to 36-6 has been described, the lock mechanism 30 is not limited thereto and another mechanism may be adopted to release the lock on all the returnable containers (all the housing places). For example, it is possible to release the lock on all the returnable containers at the same time also by providing a mechanism that moves the entire lock mechanism 30 in the y-axis negative direction and performing control for moving the entire lock mechanism 30 in the y-axis negative direction. Also in this case, all the returnable containers can be locked at an angle, such as 180°, other than the set angles for the respective pulleys 36-1 to 36-6.

While the example where the pulleys 36-1 to 36-3 are provided on the left end side of the housing places in the left row and the pulleys 36-4 to 36-6 are provided on the left end side of the housing places in the right row has been described, the configuration is not limited thereto. For example, the pulleys 36-1 to 36-3 may be provided on the left end side of the housing places in the left row, and the pulleys 36-4 to 36-6 may be provided on a right end side of the housing places in the right row. Or the pulleys 36-1 to 36-3 may be provided on a right end side of the housing places in the left row, and the pulleys 36-4 to 36-6 may be provided on the left end side or the right end side of the housing places in the right row.

When the coupling members of the lock mechanism 30 include belts, such as the belts 33, 35-1, 35-2, restrictions on the arrangement of the coupling members in the casing 11 can be reduced. Also when returnable containers are divided and housed in m rows as in FIG. 4, a configuration in which each returnable container is independently locked and unlocked by a single driving source in each row can be adopted.

Each of the belt 33 and the belts 35-1, 35-2 may be a belt with a rectangular cross-section in a longitudinal direction (flat belt) and power can be transmitted from the flat belts to the pulleys 36-1 to 36-6.

It is preferable that the belt 33 and the belts 35-1, 35-2 be synchronous belts with ribs (teeth) provided on an inner side of the flat belt. In this case, the driven rotating shafts 34-1, 34-2 and the pulleys 36-1 to 36-6 have gears. In this case, the belt 33 can transmit power by meshing with the driven rotating shafts 34-1, 34-2 and therefore can transmit power stably and reliably for a long period of time, eliminating concerns about going out of phase for a long period of time. The pulleys 36-1 to 36-6 also transmit power by meshing with the corresponding synchronous belt 35-1 or 35-2 and therefore can stably and reliably transmit power for a long period of time, eliminating concerns about going out of phase for a long period of time.

Thus, the coupling members of the lock mechanism 30 may include gears. This configuration allows for accurate control of the predetermined rotation angles and the other predetermined rotation angle.

As has been described above, in the delivery vehicle 1 according to the embodiment, the lock mechanism 30 includes the M rotary lock main bodies and the coupling members as described above, and the predetermined rotation angle for unlocking is different in each of the M rotary locking main bodies, and the M rotary lock main bodies are driven to rotate by the single driving source. Since the predetermined rotation angle for unlocking is different in each of the M rotary lock main bodies in the lock mechanism 30, the lock on only one returnable container can be released (only one returnable container can be unlocked) even when the M rotary lock main bodies are driven to rotate in conjunction with one another by the single driving source.

Since the M rotary lock main bodies are driven to rotate in conjunction with one another by the single driving source in the lock mechanism 30, it is possible to independently lock and unlock each returnable container, i.e., to unlock only a certain returnable container by the single driving source, while keeping the manufacturing cost of the rack down as much as possible (and thereby keeping the manufacturing cost of the delivery vehicle down as much as possible).

The configuration in which the M pairs of supports are divided and arrayed in m rows in the width direction of the casing 11 and arrayed in M/m tiers at regular intervals in each row so as to be arrayed in a total of M tiers has been described based on the example of m being two. However, as a configuration corresponding to m being one, a configuration in which M tiers of rails 13 are disposed in only one row in the width direction inside the casing 11 can also be adopted.

While the example where a single driving source that is common to all the rows is provided has been described, a different driving source may be provided in each row. In this case, the rack 10 can house returnable containers in L rows in the width direction of the casing 11, and includes, in each row, M pairs of supports and a lock mechanism of which M rotary lock main bodies are driven by a single driving source. This configuration makes it possible to independently lock and unlock each returnable container by a single driving source in each row when dividing and housing returnable containers in L rows. L in this case is an integer not less than two. However, L may instead be one, and in that case, the above-described configuration in which m is one applies.

Further, in this case, while it is preferable in terms of management and delivery operation that the interval B at which the supports are disposed be equal among the rows, the interval B may also be varied among the rows. Moreover, in this case, the widths of the rows (distances in the y-axis direction) may be varied, but making the widths equal allows for efficient delivery.

The embodiment has been described based on the assumption that the rack 10 can house all the returnable containers (e.g., the returnable containers 21 to 23) of two or more prespecified sizes. Of course, even when the rack 10 is a rack that can house returnable containers of one prespecified size, delivery using these returnable containers of one size can be streamlined and the same effects of the lock mechanism can be achieved. While this is not shown, when a rack that can house returnable containers of one prespecified size is adopted, a plurality of pairs of rails (supports) 13 is arrayed at regular intervals in the height direction (z-axis direction) in each row as in the embodiment, and this regular interval is set to be nearly equal to the height of the returnable containers of one size.

Further, the embodiment is based on the assumption that the M pairs of supports are arrayed in M tiers at regular intervals in the up-down direction. Alternatively, the M pairs of supports may be provided in M tiers at regular intervals in the left-right direction (one of horizontal directions that is perpendicular to the depth direction). This configuration can achieve the same effects. Thus, the M pairs of supports can be provided inside the casing so as to extend in the depth direction and arrayed in M tiers at regular intervals in a predetermined direction that is one of the up-down direction and the left-right direction.

Although this will not be described in detail, the rack of such a configuration is, for example, the rack 10 of FIG. 1 turned 90 degrees counterclockwise, for which returnable containers that are open at the upper side can be adopted. Alternatively, adopting returnable containers having a lid to close the opening can eliminate the likelihood of articles falling out of the returnable containers.

While the embodiment has been described based on the assumption that the rotary lock main bodies illustrated as pulleys are electrically driven by the driving source, the embodiment can also adopt a lock mechanism that manually locks and unlocks without having a driving source. For example, the lock mechanism 30 may have a hand-turned lever instead of the motor 31, at the part of the motor 31.

In the embodiment, also when such a configuration of manual locking and unlocking is adopted, providing one operating part like the lever for a plurality of objects to be locked suffices, so that the manufacturing cost can be kept down. Moreover, in this case, the operating part for locking and unlocking the returnable containers can be provided in a common region, which has the advantage of facilitating the operation.

The delivery vehicle 1 can be, for example, an autonomous (driverless) vehicle. The depth direction of the rack 10 in the delivery vehicle 1 corresponds to the left-right direction or the front-rear direction of the vehicle. When the vehicle is not an autonomous vehicle, since the driver's seat is commonly disposed on the front side, the inner side in the depth direction is the side of the driver's seat in the left-right direction.

If the delivery vehicle 1 is an autonomous vehicle, delivery costs can be reduced. For example, the delivery vehicle 1 can travel on sidewalks and the like, let alone roads, and can deliver the returnable containers 21 to 23 to the vicinity of a place where they are unloaded or a place where they are transferred. When the vehicle becomes unable to travel autonomously, for example, the delivery vehicle 1 may be remotely operated. A delivery person may drive the delivery vehicle 1, and may carry the articles (i.e., the returnable containers 21 to 23) to a place where the articles are transferred from the delivery vehicle 1 and transfer them. The place to which the returnable containers 21 to 23 are transferred may be, for example, a rack similar to the rack 10.

It is also possible to house articles in the returnable containers 21 to 23 with, for example, an order identification information id attached thereto, and deliver the articles in this state. The order identification information id attached to the returnable containers 21 to 23 is, for example, a character, symbol, barcode, two-dimensional code, or radio frequency identifier (FRID). For example, a reader (not shown) that can read the order identification information id attached to the returnable containers 21 to 23 can be provided in the rack 10 of the delivery vehicle 1 or at other part of the delivery vehicle 1. Thus, the control unit of the delivery vehicle 1 can also perform control such that the lock on a returnable container to be unloaded is released by specifying the order identification information id.

Second Embodiment

Figure 8:
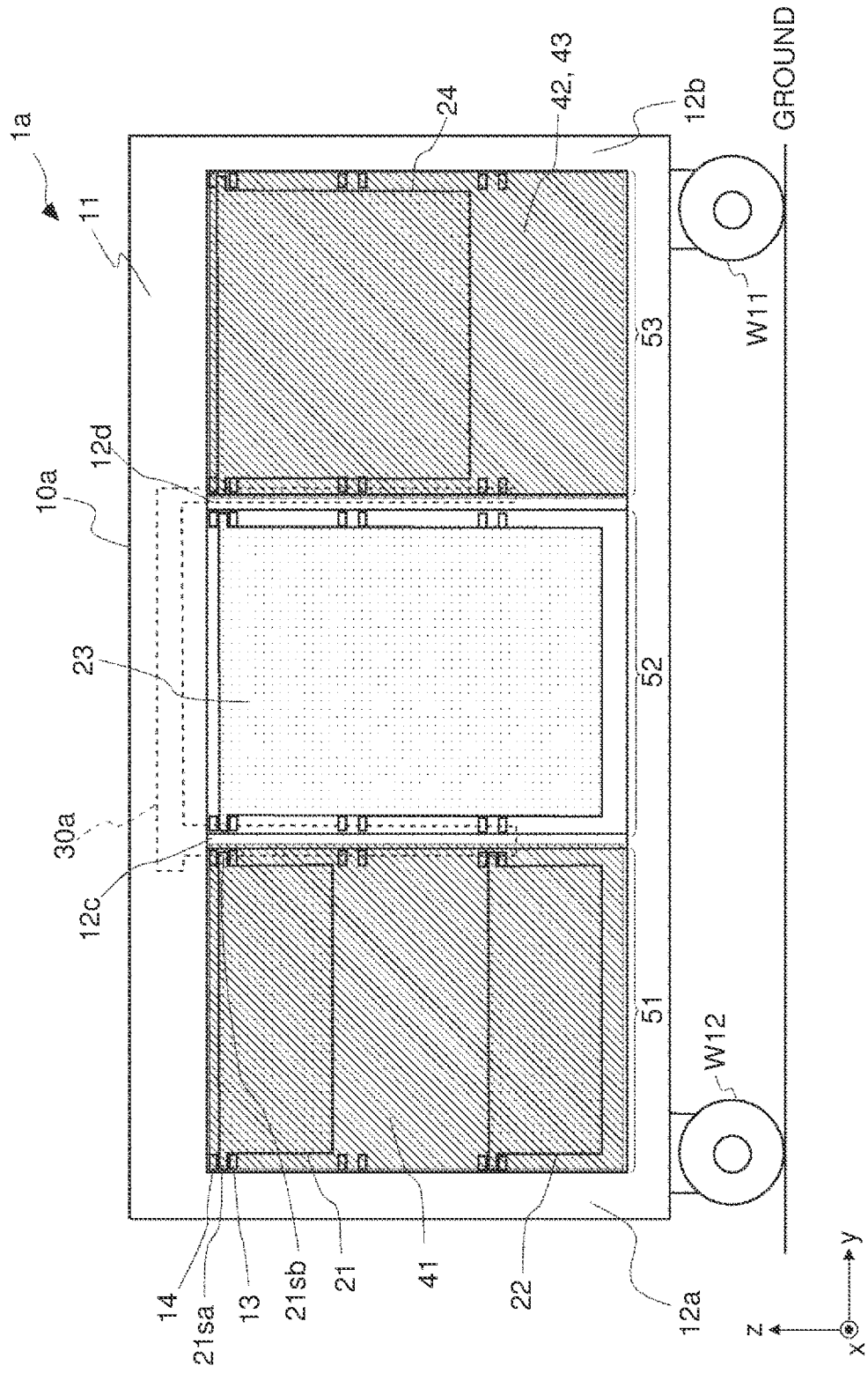
FIG. 8 is a schematic side view showing one example of a delivery vehicle according to a second embodiment.

Next, a delivery vehicle according to a second embodiment will be described with reference to FIG. 8. FIG. 8 is a schematic side view showing one example of the delivery vehicle according to the second embodiment.

As shown in FIG. 8, a delivery vehicle 1a according to this embodiment is the same as the delivery vehicle 1 except that the number of rows is increased to three, that doors 41, 42, 43 to open and close the respective rows are provided, and that a lock mechanism 30a is provided instead of the lock mechanism 30. While the configuration is otherwise the same and description of the same parts will be omitted, various application examples described in the first embodiment are applicable.

A rack 10a of the delivery vehicle 1a is the same as the rack 10 except that the rack 10a is configured to have three rows. Therefore, an additional partition plate 12d is provided, and three pairs of rails 13 and three pairs of auxiliary parts 14 are provided between a front plate 12b and the partition plate 12d, between the partition plate 12d and a partition plate 12c, and between the partition plate 12c and a back plate 12a.

The doors 41, 42, 43 can be provided to prevent putting in and out of returnable containers in a left row 51, a center row 52, and a right row 53, respectively, and can be slid along rails (not shown) that are provided on an upper side and a lower side of the doors. FIG. 8 shows a state where the center row 52 is opened by moving the door 42 so as to overlap the door 43. While the rails can be arranged such that each of the doors 41 to 43 can be moved only to an adjacent row, the rails for the doors 41 to 43 can also be provided such that each door can be disposed offset in any row.

In the example where the rails 13 are provided in m rows, it is possible to include (m−1) doors, i.e., to provide doors for only two rows when there are three rows as in this example of the configuration. Then, for an open row, putting in and out of returnable containers can be controlled by the lock mechanism 30a.

The lock mechanism 30a can be said to have the same locking method as the lock mechanism 30, but has a configuration in which one rotary lock main body is provided for each tier in the partition plate 12c between the left row 51 and the center row 52 such that the effect of unlocking and locking is exerted on the same tiers in the two adjacent rows.

While this is not shown in detail in FIG. 8, for example, the pulleys 36-1, 36-2, 36-3 for the respective tiers in FIG. 4 extend through the partition plate 12c, and may have such a size (diameter) as to be able to switch between engaging with and disengaging from both the notch in the protrusion of the returnable container (e.g., the returnable container 21 or 22) housed in the left row 51 and the notch in the protrusion of the returnable container (e.g., the returnable container 23) housed in the center row 52. Driving control of the motor 31 should be executed such that a phase for engaging with the notch in the protrusion of the returnable container housed in the left row 51 and a phase for engaging with the notch in the protrusion of the returnable container housed in the center row 52 are 180° different from each other.

In the partition plate 12*d*, one rotary lock main body may be provided for each tier only in the one row of the right row 53 (the row in which a returnable container 24 is depicted) so as to be able to control locking and unlocking as in the first embodiment. The pulleys provided in the partition plate 12*d* may be different in the phase of the notch from the pulleys provided in the partition plate 12*c*. Of course, it is also possible to configure the lock mechanism in this embodiment such that two adjacent rows can be controlled on the side of the partition plate 12*d* while only one row of the left row 51 can be controlled on the side of the partition plate 12*c*, or that two rows can be controlled on both sides of the partition plates 12*c*, 12*d*.

In this configuration in which the doors 41 to 43 for preventing putting in and out of the returnable containers are provided, the number of pulleys to be controlled can be reduced and thereby the number of returnable containers that can be controlled by a single driving source, such as the motor 31, can be further increased.

For example, when the number of rows is three as in FIG. 8, pulleys for two rows suffice. Therefore, for example, when 34 pulleys with their phases shifted from one another in increments of 10° are used, it is possible to set the number of rows in a vertical direction to 17 (17 tiers) and control permission and prohibition of putting in and out the returnable containers for 51 (=34÷2×3) housing places, for example, by a single motor.

While only a lateral side on the positive side in the x-axis direction is shown in FIG. 8, providing a wall on the lateral side on the negative side in the x-axis direction without doors can prevent putting in and out of the returnable containers from that lateral side. Of course, similar doors may also be provided on that lateral side. In this case, putting in and out of the returnable containers can be permitted or prohibited according to whether the left row 51, the center row 52, and the right row 53 are opened on one lateral side or both lateral sides by the doors on the positive side in the x-axis direction and the doors on the negative side in the x-axis direction.

The example where pulleys provided for the respective tiers so as to be shared by two adjacent rows are used for some or all rows (all pairs of adjacent rows) can be applied also in the first embodiment in which doors are not provided. Thus, sharing of the rotary lock main body by two adjacent rows is also applicable to the first embodiment in the case where housing places are provided in two or more rows.

Third Embodiment

Figure 9:
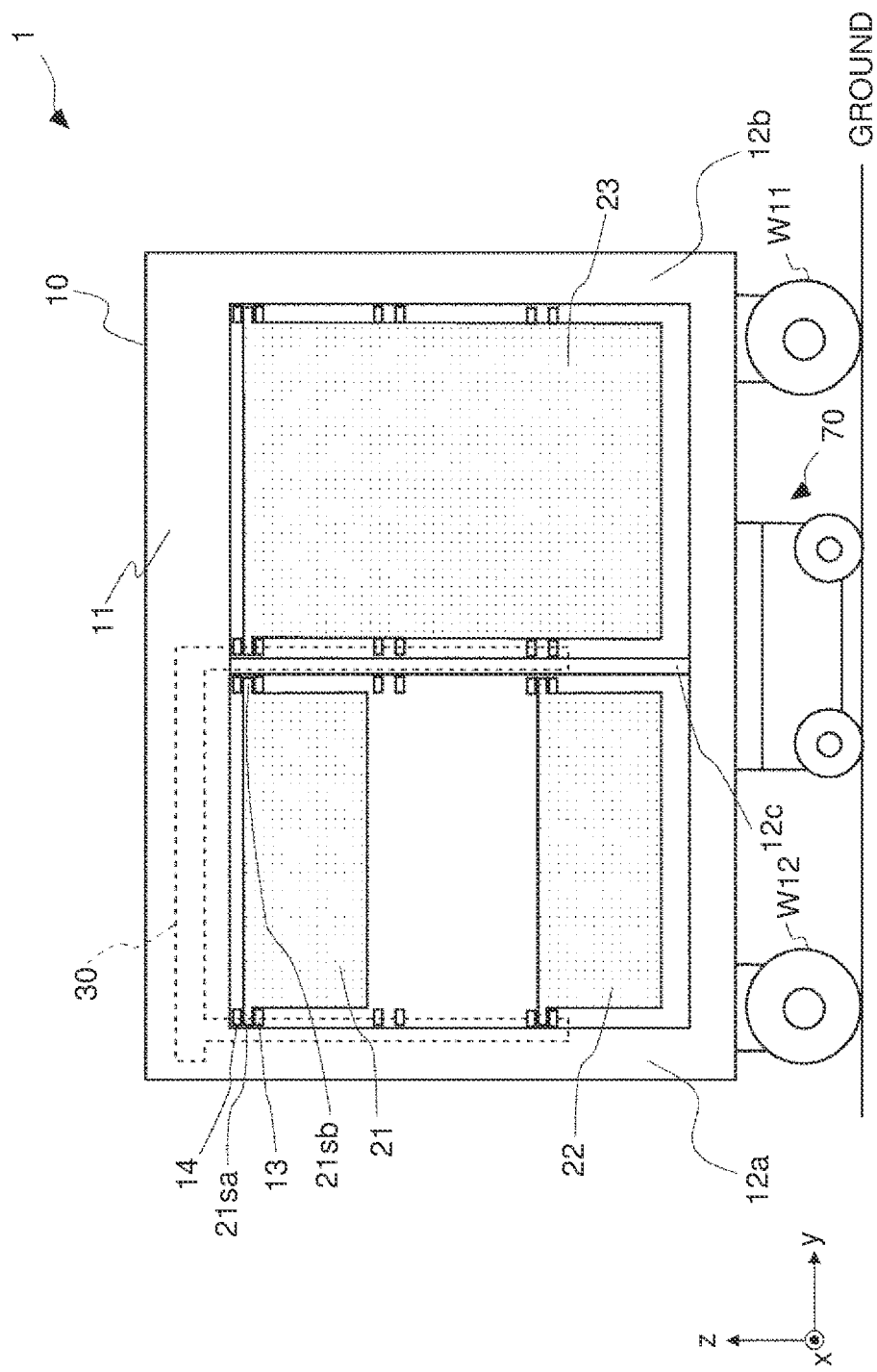
FIG. 9 is a schematic side view of a delivery vehicle according to a third embodiment.

Next, a delivery vehicle according to a third embodiment will be described with reference to FIG. 9 and FIG. 10. FIG. 9 is a schematic side view of the delivery vehicle according to the third embodiment, and FIG. 10 is a schematic side view of a transfer robot.

As shown in FIG. 9, in this embodiment, while the delivery vehicle 1 delivers the returnable containers 21 to 23, a transfer robot 70 may be housed under the delivery vehicle 1 and mechanically or electromagnetically coupled thereto. The transfer robot 70 is an autonomous vehicle that, after the delivery vehicle 1 arrives in the vicinity of a delivery rack similar to the rack 10, transfers the returnable containers 21 to 23 (i.e., the articles) from the delivery vehicle 1 to that delivery rack. If the lock mechanism 30 is electrically controllable, each returnable container can be easily locked and unlocked at the time of loading and unloading for transfer.

Figure 10:
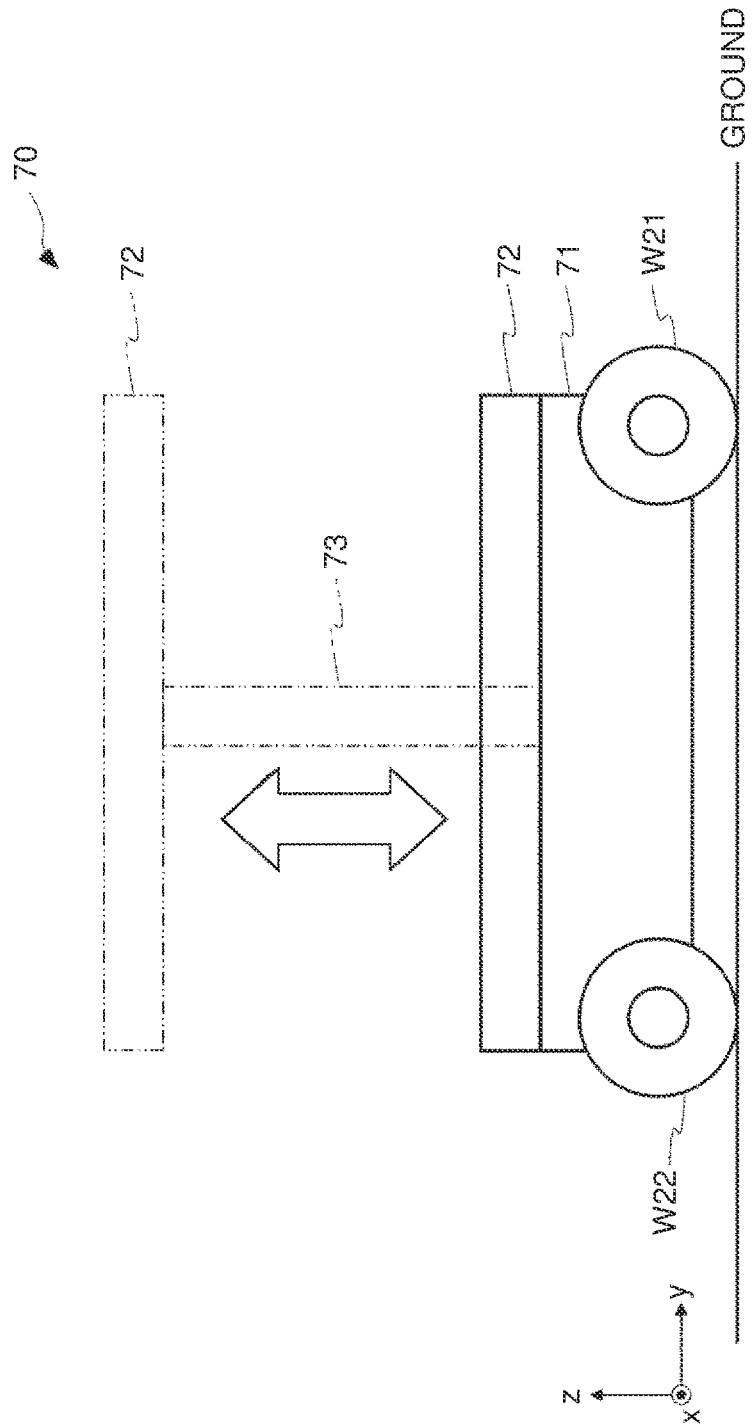
FIG. 10 is a schematic side view of a transfer robot.

As shown in FIG. 10, the transfer robot 70 includes wheels W21, W22, a main body 71, a top plate 72, and a pillar 73. The two pairs of wheels W21, W22 are rotatably fixed under the main body 71 and driven by a driving source (not shown), such as a motor.

As shown in FIG. 10, the top plate 72 is coupled to the main body 71 through an extendable-contractable pillar 73. The top plate 72 is coupled at an upper end of the pillar 73, and the transfer robot 70 transfers the returnable containers 21 to 23 with the returnable containers 21 to 23 placed on the top plate 72. The pillar 73 has, for example, a telescopic extending-contracting mechanism and is extended and contracted by a driving source (not shown), such as a motor. As indicated by the outlined arrow in FIG. 10, changing the length of the pillar 73 can change the level of the top plate 72. Therefore, the returnable containers 21 to 23 can be transferred from any housing place in the delivery vehicle 1 to any housing place in the delivery rack.

Here, the transfer robot 70 includes a manipulator (not shown), for example, and using the manipulator, moves the returnable containers 21 to 23 from the delivery vehicle 1 to the top plate 72 and thus transfers them. Then, using the manipulator, the transfer robot 70 moves the returnable containers 21 to 23 from the top plate 72 to the delivery rack.

In the configuration shown in FIG. 9, the transfer robot 70 may serve as a power source to move the delivery vehicle 1. This means that the delivery vehicle 1 need not have a driving source for driving the wheels W11, W12. In this case, a plurality of (e.g., two) transfer robots 70 may be provided side by side in the y-axis direction to move the delivery vehicle 1. The transfer robot 70 may be mounted on the delivery vehicle 1 or travel alongside the delivery vehicle 1.

The configuration of the third embodiment is otherwise the same as that of the first embodiment and therefore will not be further described. The various application examples described in the first and second embodiments are applicable also in this embodiment. For example, the delivery vehicle 1*a* of FIG. 8 may be adopted also in this embodiment.

Fourth Embodiment

Figure 11:
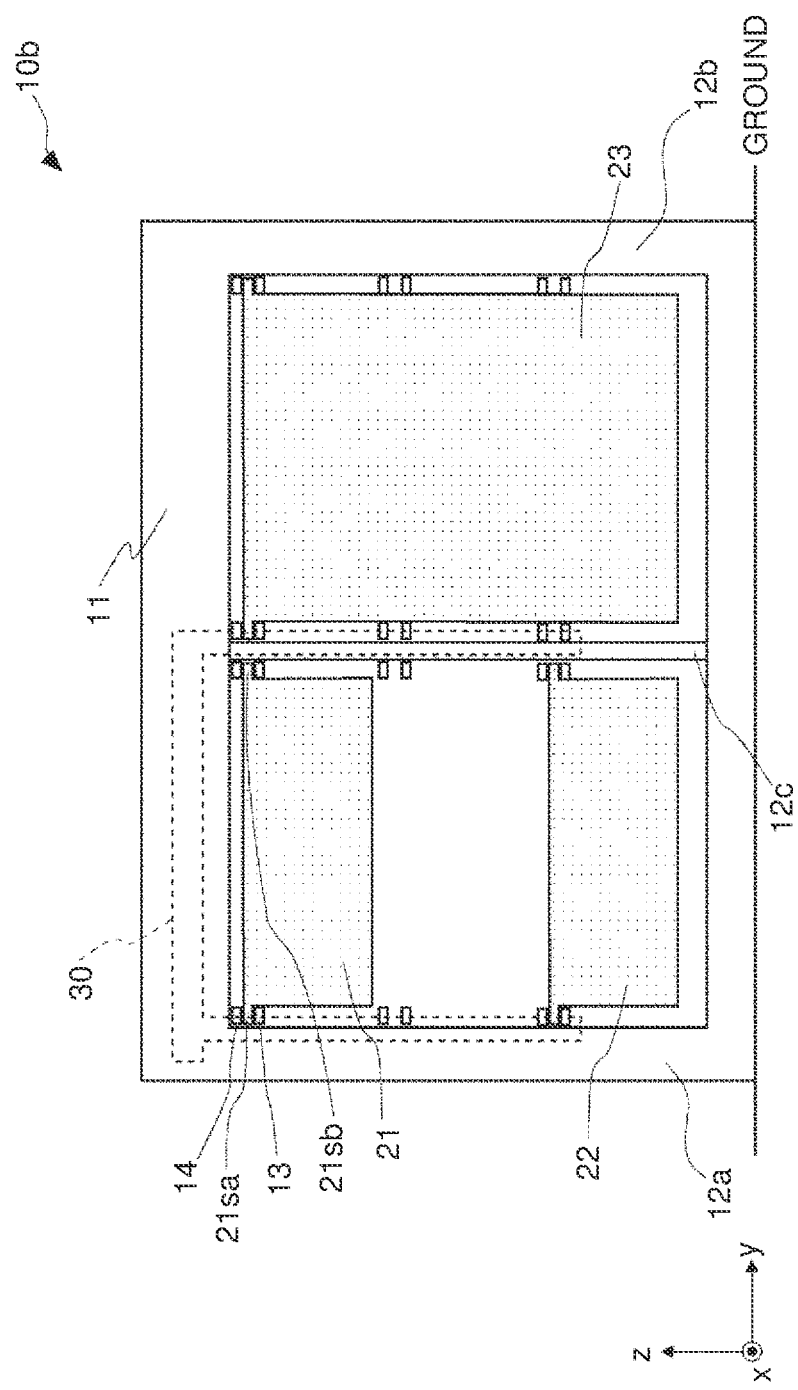
FIG. 11 is a schematic side view showing one example of a delivery rack according to a fourth embodiment.

FIG. 11 is a schematic front view showing one example of a delivery rack according to a fourth embodiment. As shown in FIG. 11, a delivery rack 10*b* according to this embodiment can adopt the same configuration as the rack 10 mounted on the delivery vehicle 1 of FIG. 1 and FIG. 9. While this will not be described in detail, the delivery rack 10*b* can include a casing 11, a partition plate 12*c*, rails 13, auxiliary parts 14, and a lock mechanisms 30.

The delivery rack 10*b* according to this embodiment can be installed as a place to which the returnable containers 21 to 23 are moved from the delivery vehicle 1, or can be installed as a rack in which the returnable containers 21 to 23 to be delivered by the delivery vehicle 1 are stored beforehand. Thus, the delivery rack 10*b* can be used as a receiving place and a sending place in delivering articles using the returnable containers 21 to 23. In the delivery rack 10*b*, the returnable containers 21 to 23 that have become empty after the articles have been taken out can be collected as appropriate by the delivery vehicle 1.

The delivery rack 10*b* can also be provided outdoors. As an example of outdoor usage, the delivery rack 10*b* may be installed in the entrance or a corridor of an apartment complex. Further, the delivery rack 10b may be installed in a house, and may be provided indoors. The term "house" here covers an apartment complex, an office building, etc.

The delivery rack 10b may be provided so as to extend through an outer wall of a house. This configuration makes it possible to carry the delivered returnable containers 21 to 23 into the delivery rack 10b from outdoors, and to take the returnable containers 21 to 23 out of the delivery rack 10b on an inside of a residential space. The term "residential space" here covers an office space. In this case, for example, an outer door and an inner door (not shown) that can be opened and closed may be provided on an outdoor side and an indoor side of the delivery rack 10b, and an interlock mechanism that prevents the outer door and the inner door from opening at the same time may be provided. This can protect the privacy of people living in the house.

In addition, the various application examples described in the first to third embodiments are applicable also to the delivery rack according to this embodiment. For example, this delivery rack can adopt the same configuration as the rack 10a mounted on the delivery vehicle 1a of FIG. 8.

Others

In the above examples, the various control programs can be stored using various types of non-transitory computer-readable media and supplied to a computer. Non-transitory computer-readable media include various types of tangible storage media. Examples of non-transitory computer-readable media include a magnetic recording medium (e.g., a flexible disc, magnetic tape, and hard disk drive), a magneto-optical recording medium (e.g., a magneto-optical disk), a CD-ROM, a CD-R, a CD-R/W, and a semiconductor memory (e.g., a mask ROM, programmable ROM (PROM), erasable PROM (EPROM), flash ROM, and RAM). Alternatively, the programs may be supplied to a computer by various types of transitory computer-readable media. Examples of transitory computer-readable media include electric signals, optical signals, and electromagnetic waves. Transitory computer-readable media can supply the programs to a computer through a wire communication channel, such as a wire or an optical fiber, or a wireless communication channel.

The present disclosure is not limited to the above-described embodiments but can be changed as appropriate within a range that does not depart from the gist of the disclosure. For example, the height of the returnable container to be housed is not limited to being nearly a multiple of the interval B, if streamlining of delivery is not pursued and housing the returnable containers so as to be spaced apart in a predetermined direction (in FIG. 1, the height direction) is tolerated. In the example where three pairs of rails 13 are provided in each row as in FIG. 1, returnable containers of which the heights are, for example, 0.5, 1.5, or 2.7 times the interval B can also be housed.

What is claimed is:

1. A delivery rack comprising:
   a casing;
   M pairs of supports, with M being an integer not less than two, that are provided inside the casing so as to extend in a depth direction and arrayed in M tiers at regular intervals in a predetermined direction that is one of an up-down direction and a left-right direction; and
   a lock mechanism configured to lock returnable containers housed while being supported so as to be slidable along the respective M pairs of supports,
   the delivery rack being configured to house all the returnable containers of one or more prespecified sizes, wherein:
   the lock mechanism includes:
      M rotary lock main bodies that are respectively provided at the M pairs of supports and each unlock at a predetermined rotation angle; and
      a coupling member that couples the M rotary lock main bodies to one another and allows the M rotary lock main bodies to rotate in conjunction with one another;
   the predetermined rotation angle for unlocking is different for each of the M rotary lock main bodies, and the M rotary lock main bodies are configured to be driven to rotate by a single driving source;
   a protrusion that protrudes from each returnable container toward an outer side in an orthogonal direction orthogonal to the predetermined direction slides over the supports; and
   the protrusion has a notch that is engaged with one of the M rotary lock main bodies when locking the returnable container and disengaged from the one of the M rotary lock main bodies when unlocking the returnable container.

2. The delivery rack according to claim 1, wherein each of the M rotary lock main bodies unlocks at another predetermined rotation angle that is common to all the M rotary lock main bodies.

3. The delivery rack according to claim 1, wherein the M pairs of supports, with M being an integer not less than four, are divided and arrayed in m rows, with m being an integer not less than two and a divisor of M, in a direction orthogonal to the predetermined direction of the casing, and are arrayed in M/m tiers at regular intervals in each row, so as to be arrayed in a total of M tiers.

4. The delivery rack according to claim 1, wherein:
   the delivery rack is able to house returnable containers in L rows, with L being an integer not less than one, in a direction orthogonal to the predetermined direction of the casing; and
   the delivery rack includes, in each row, the M pairs of supports and the lock mechanism of which the M rotary lock main bodies are driven by the single driving source.

5. The delivery rack according to claim 1, wherein the coupling member includes a belt.

6. The delivery rack according to claim 1, wherein the coupling member includes a gear.

7. A delivery vehicle comprising:
   a rack, the rack comprising:
      a casing;
      M pairs of supports, with M being an integer not less than two, that are provided inside the casing so as to extend in a depth direction and arrayed in M tiers at regular intervals in a predetermined direction that is one of an up-down direction and a left-right direction; and
      a lock mechanism configured to lock returnable containers housed while being supported so as to be slidable along the respective M pairs of supports,
   the rack being configured to house all the returnable containers of one or more prespecified sizes, wherein:
   the lock mechanism includes:
      M rotary lock main bodies that are respectively provided at the M pairs of supports and each unlock at a predetermined rotation angle; and
      a coupling member that couples the M rotary lock main bodies to one another and allows the M rotary lock main bodies to rotate in conjunction with one another;

the predetermined rotation angle for unlocking is different for each of the M rotary lock main bodies, and the M rotary lock main bodies are configured to be driven to rotate by a single driving source;

a protrusion that protrudes from each returnable container toward an outer side in an orthogonal direction orthogonal to the predetermined direction slides over the supports; and the protrusion has a notch that is engaged with one of the M rotary lock main bodies when locking the returnable container and disengaged from the one of the M rotary lock main bodies when unlocking the returnable container.

8. The delivery vehicle according to claim 7, wherein each of the M rotary lock main bodies unlocks at another predetermined rotation angle that is common to all the M rotary lock main bodies.

9. The delivery vehicle according to claim 7, wherein the M pairs of supports, with M being an integer not less than four, are divided and arrayed in m rows, with m being an integer not less than two and a divisor of M, in a direction orthogonal to the predetermined direction of the casing, and are arrayed in M/m tiers at regular intervals in each row, so as to be arrayed in a total of M tiers.

10. The delivery vehicle according to claim 7, wherein:
the rack is able to house returnable containers in L rows, with L being an integer not less than one, in a direction orthogonal to the predetermined direction of the casing; and the rack includes, in each row, the M pairs of supports and the lock mechanism of which the M rotary lock main bodies are driven by the single driving source.

11. The delivery vehicle according to claim 7, wherein the coupling member includes a belt.

12. The delivery vehicle according to claim 7, wherein the coupling member includes a gear.

13. The delivery vehicle according to claim 7, wherein the delivery vehicle is an autonomous vehicle.

* * * * *